US012580371B2

(12) United States Patent
    Abbiati

(10) Patent No.: US 12,580,371 B2
(45) Date of Patent: Mar. 17, 2026

(54) CABLE RETAINING ARRANGEMENT

(71) Applicant: Prysmian S.p.A., Milan (IT)

(72) Inventor: Fabio Abbiati, Milan (IT)

(73) Assignee: PRYSMIAN S.P.A., Milan (IT)

( * ) Notice: Subject to any disclaimer, the term of this patent is extended or adjusted under 35 U.S.C. 154(b) by 35 days.

(21) Appl. No.: 18/644,974

(22) Filed: Apr. 24, 2024

(65) Prior Publication Data

US 2024/0356318 A1        Oct. 24, 2024

(30) Foreign Application Priority Data

Apr. 24, 2023    (IT) ......................... 102023000008046

(51) Int. Cl.
    *H02G 3/08*        (2006.01)
(52) U.S. Cl.
    CPC ................................... *H02G 3/083* (2013.01)
(58) Field of Classification Search
    CPC ........ H02G 3/123; H02G 3/125; H02G 3/121;
            H02G 3/14; H02G 3/126; H02G 3/088;
            H02G 3/083; H02G 3/22; H02G 3/10;
            H02G 15/007; H02G 15/013
    USPC .................... 220/3.8, 4.02, 3.3, 3.5, 3.9, 3.2
    See application file for complete search history.

(56) References Cited

U.S. PATENT DOCUMENTS

| | | | | |
|---|---|---|---|---|
| 4,721,830 A | * | 1/1988 | Dagan .................. | H02G 15/117 |
| | | | | 174/41 |
| 6,545,217 B2 | * | 4/2003 | Sato ....................... | H02G 3/088 |
| | | | | 174/64 |
| 2004/0156611 A1 | * | 8/2004 | Cloud .................. | G02B 6/4444 |
| | | | | 385/135 |

FOREIGN PATENT DOCUMENTS

WO        WO 2007/149104        12/2007

OTHER PUBLICATIONS

Search Report in Italian Application No. 202300008046, dated Oct. 24, 2003.

* cited by examiner

*Primary Examiner* — King M Chu
(74) *Attorney, Agent, or Firm* — Haynes and Boone, LLP

(57)        ABSTRACT

A cable retaining arrangement for retaining at least a cable with respect to an opening formed on a wall of a cable box having an attaching element configured to be attached to the wall of the cable box, a retaining element extending from the attaching element along a longitudinal direction and which is configured to retain at least a cable passing through the opening, the retaining element having two frames mutually spaced apart along a spacing direction perpendicular to the longitudinal direction, the two frames defining therebetween: a first receiving area for accommodating a first portion of a figure-eight cable; a second receiving area for accommodating a second portion of the figure-eight cable; a joining area for joining the first receiving area and the second receiving area and configured to accommodate an intermediate portion of the figure-eight cable connecting the first portion and the second portion of the figure-eight cable.

13 Claims, 9 Drawing Sheets

100

110

A

113

110a

B                    B 111                  114

112    112

110b

A

CABLE RETAINING ARRANGEMENT

FIELD OF THE INVENTION

The present invention relates to the field of equipment and components for the installation of cables on a cable box. In particular, the present invention relates to an arrangement for retaining figure-eight cables (or figure-8 cables), optical cables, electrical cables or hybrid cables to a cable box namely a terminal box or a junction box.

BACKGROUND OF THE INVENTION

Typically, cables entering/exiting into/from a cable box must be fixed and, at the same time, centered in order to guarantee a sealing effect and/or avoid excessive cable bending. Specifically, the retaining systems involve specific retaining and fixing means to retain figure-8 cables and standard circumferential section cable which are mutually incompatible.

EP3937322A1 discloses a centering arrangement for centering a cable with respect to an opening formed on a wall of a cable box. Such centering arrangement comprises a joining element configured to be attached to the wall of the cable box and a centering element extending from the joining element along a longitudinal direction. The centering element is configured to support a cable passing through the opening. Specifically, the centering element comprises two or more portions arranged mutually adjacent along the longitudinal direction and configured to rotate mutually and relative to the joining element around a rotation axis perpendicular to the longitudinal direction.

The abovementioned centering arrangement can retain only standard circumferential section cables and it results incompatible to correctly retain also figure-8 cables.

SUMMARY OF THE INVENTION

The applicant has tackled the problem of providing a retaining arrangement able to retain figure-8 cables but also standard circumferential section cables having different diameters with respect to cable box as well as with respect to a sealing system associated to the opening of the cable box.

The Applicant has found that providing a retaining arrangement with a retaining element attached to the wall of the cable box by means of an attaching element and comprising two frames configured to define receiving areas for a figure-8 cable, allows to correctly retain a figure-8 cable with respect to the opening as well as standard circumferential section cables.

Therefore, the present invention relates to a cable retaining arrangement for retaining at least a cable with respect to an opening formed on a wall of a cable box, said retaining arrangement comprising an attaching element configured to be attached to the wall of the cable box, a retaining element extending from the attaching element along a longitudinal direction, the retaining element being configured to retain at least a cable passing through the opening. The retaining element comprises two frames mutually spaced apart along a spacing direction perpendicular to the longitudinal direction, the two frames defining therebetween: a first receiving area for accommodating a first portion of a figure-eight cable; a second receiving area for accommodating a second portion of the figure-eight cable; a joining area for joining the first receiving area and the second receiving area and configured to accommodate an intermediate portion of the figure-eight cable connecting the first portion and the second portion of the figure-eight cable.

According to one embodiment, first receiving area, the second receiving area and the joining area are counter shaped to a figure-eight cable.

According to one embodiment, the first receiving area, the second receiving area and the joining area are configured to cooperate to retain the figure-eight cable along a transversal direction perpendicular to the longitudinal direction and to the spacing direction.

According to one embodiment, the retaining element comprises friction members at the joining area configured to prevent sliding of the figure-eight cable arranged between the frames along the longitudinal direction, the friction members comprising one or more protrusions.

According to one embodiment, each frame comprises a supporting member extending from the attaching element along the longitudinal direction and one or more retaining brackets, arranged mutually spaced apart along the longitudinal direction and projecting from the supporting member along the spacing direction towards the other frame. The retaining brackets defines therebetween the first receiving area, the second receiving area and the joining area.

According to one embodiment, each retaining bracket has a base and two curved arms mutually diverging from the base; the curved arms comprising a first curved arm and a second curved arm; the retaining brackets are configured to define the joining area between the respective bases and to define the first receiving area and the second receiving area respectively between the first arms and the second arms.

According to one embodiment, at least one supporting member comprises retaining members projecting outwards with respect to the first receiving area and the second receiving area, the retaining members being configured to retain a cable tie along the longitudinal direction.

According to one embodiment, each frame comprises a connecting member configured to mutually connect the bases of adjacent retaining brackets; two adjacent retaining brackets, the supporting member and the relative connecting member defining therebetween passing through apertures, the passing through apertures of the frames being configured to retain a cable tie along the longitudinal direction.

According to one embodiment, the frames are elastically deformable and configured to generate a compression force along the spacing direction upon accommodation of a figure-eight cable.

According to one embodiment, the first accommodating area and the second accommodating area are configured to accommodate one or more cables.

The present invention further relates to a retaining assembly comprising a cable to be retained with respect to an opening formed on a wall of a cable box, at least one retaining arrangement for retaining the cable with respect to the opening.

The present invention further relates to a cable box comprising: a wall having at least one opening for the passage of one or more cables, at least one retaining arrangement, the attaching element is fixed to the wall proximate to the opening of the wall for supporting one or more cables with respect to the opening.

According to one embodiment, the cable box comprises a sealing element arranged at the one opening inside the box and configured to seal the opening upon passage of the one or more cables, the sealing element comprising one or more centering openings mutually combinable for receiving one or more cables supported by the at least one retaining arrangement.

According to one embodiment, the sealing element extends between two opposed portions along an extension direction, the sealing element having one first centering opening in a portion and two second centering openings in the other portion, the first centering opening and the second centering openings are configured to couple selectively with the first receiving area and to the second receiving area.

BRIEF DESCRIPTION OF THE DRAWINGS

The present invention will now be described in more detail hereinafter with reference to the accompanying drawings, in which some embodiments of the invention are shown.

DETAILED DESCRIPTION

Figure 8:
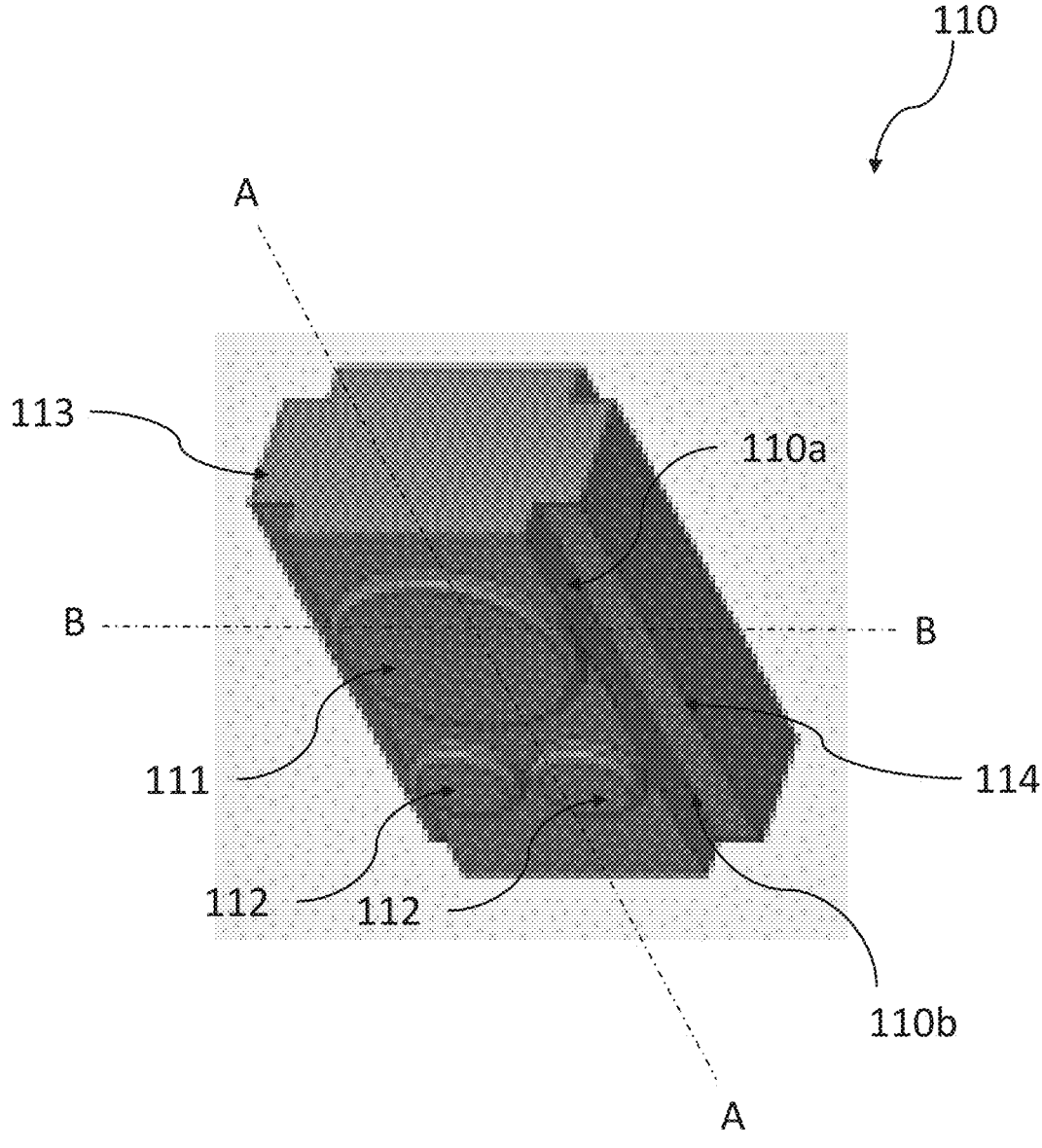
FIG. 8 is a perspective view of the sealing element according to one embodiment of the present invention.
Figure 9:
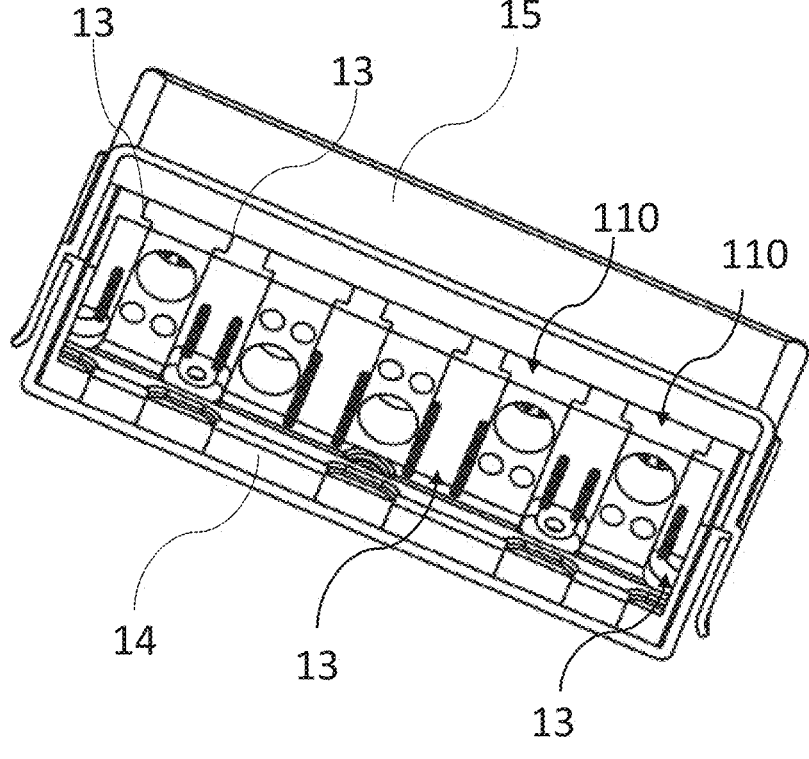
FIG. 9 is a section view of the cable box of FIG. 1.

For the purpose of the present invention, cables 2, 3 are deemed to be any optical cables or electrical cables, hybrid cables or figure-8 cables as well as a cable box is deemed to be adapted to selectively receive optical cables, electrical cables, hybrid cables or a figure-8 cable.

Figure 1:
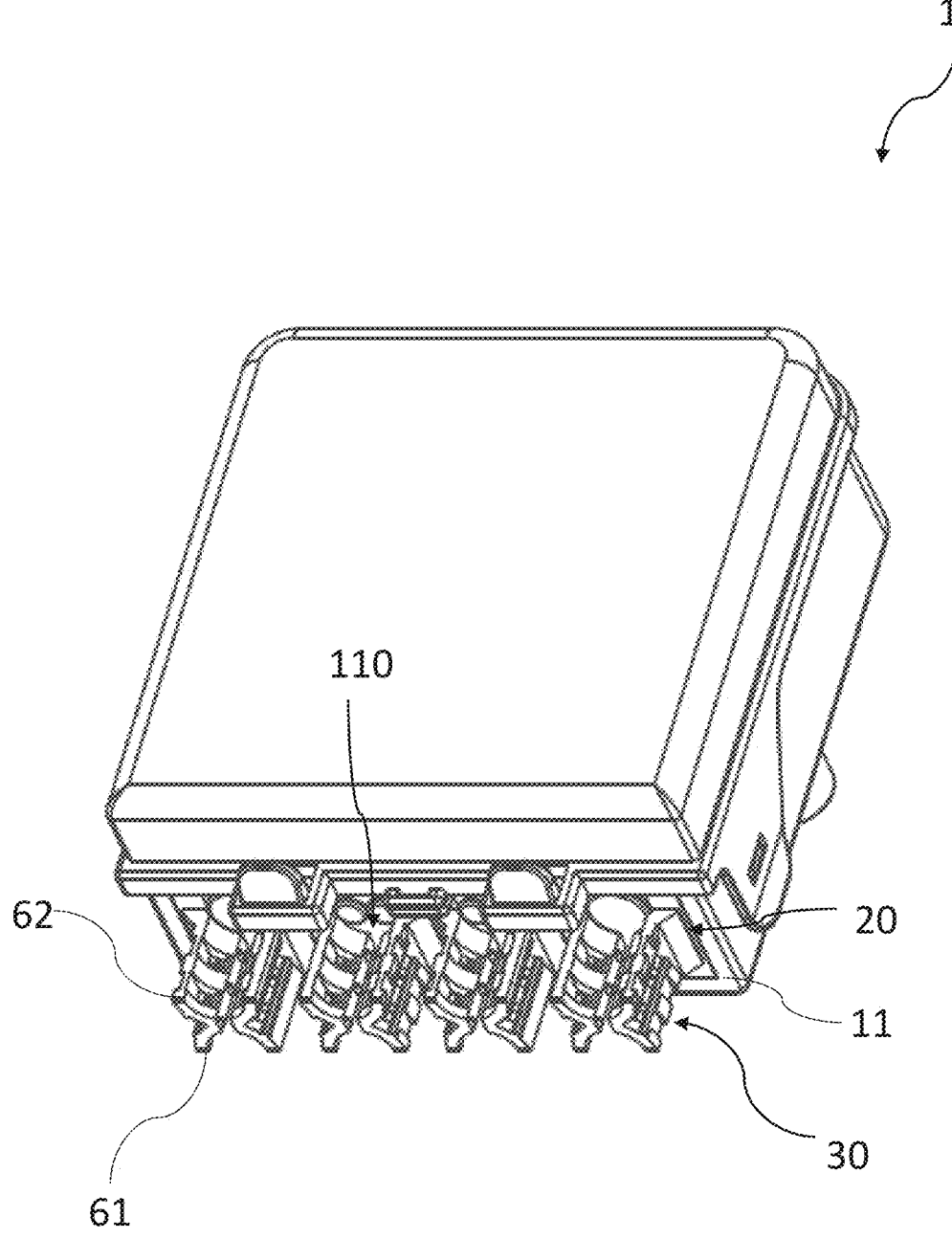
FIG. 1 is a perspective view of the retaining arrangement mounted on a cable box according to one embodiment of the present invention.
Figure 2:
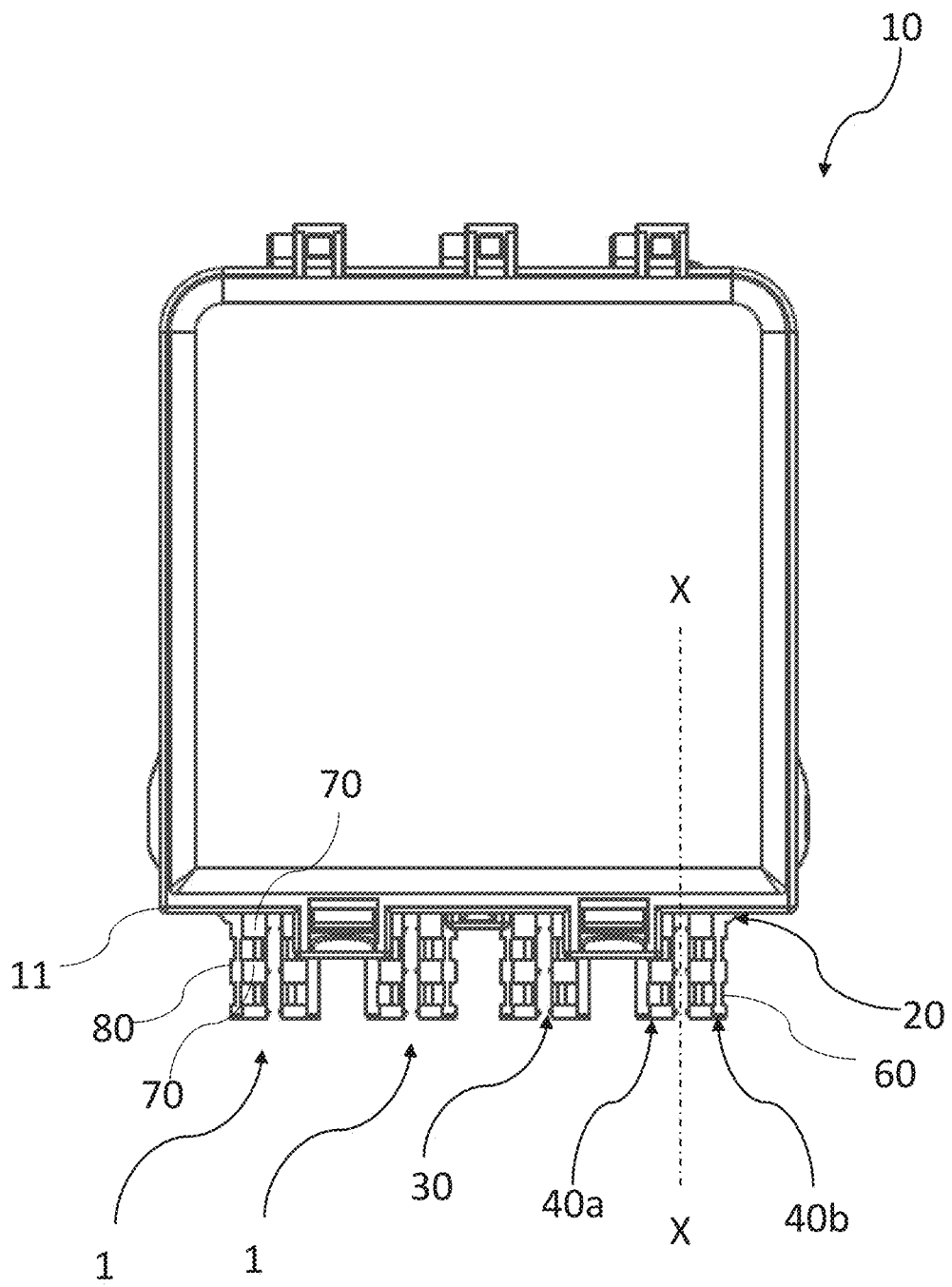
FIG. 2 is top view of the retaining arrangement of the FIG. 1.
Figure 3:
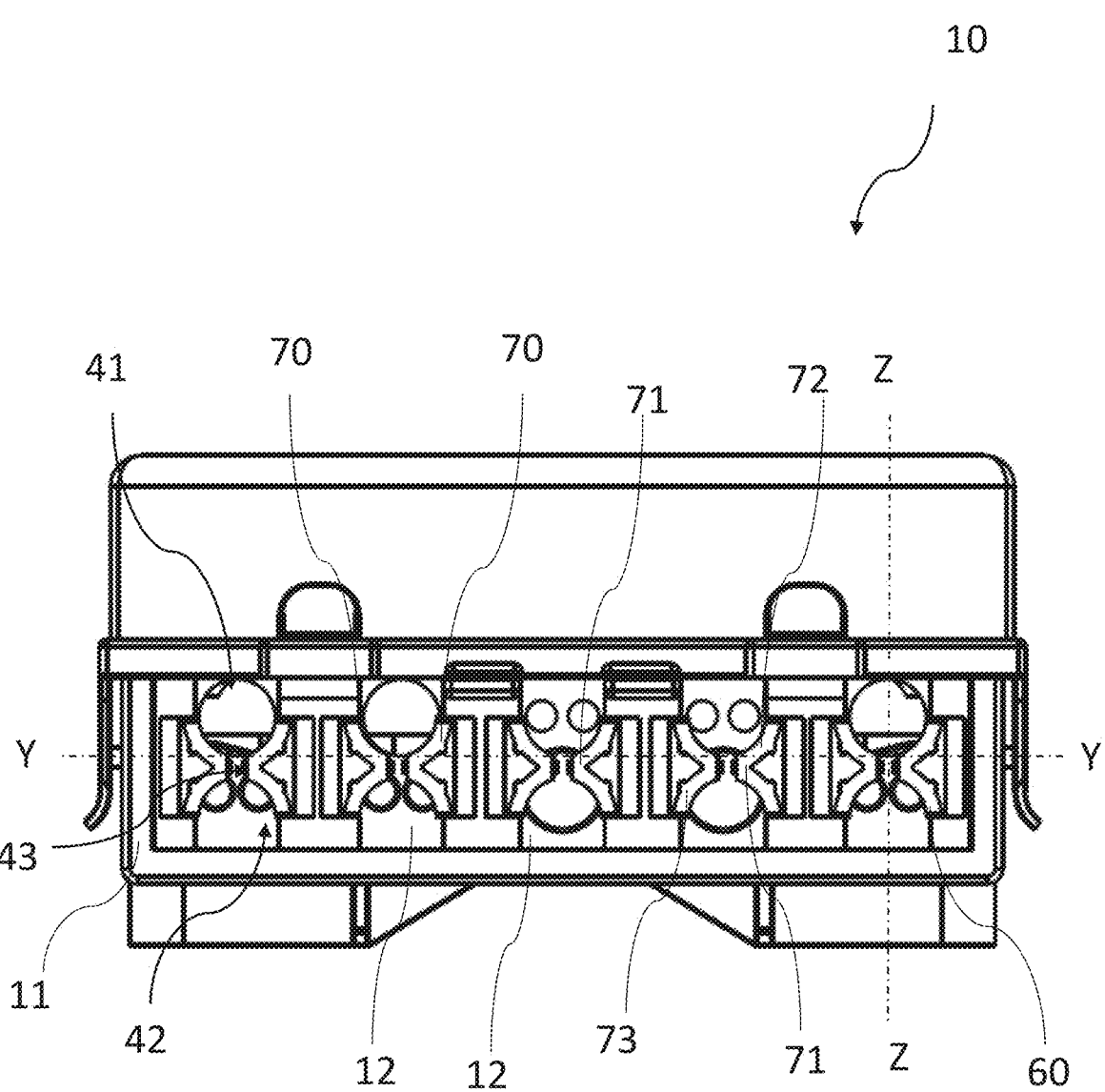
FIG. 3 is a front view of the retaining arrangement of the FIG. 1.
Figure 4:
FIG. 4 is a side view of the retaining arrangement of the FIG. 1
Figure 4:
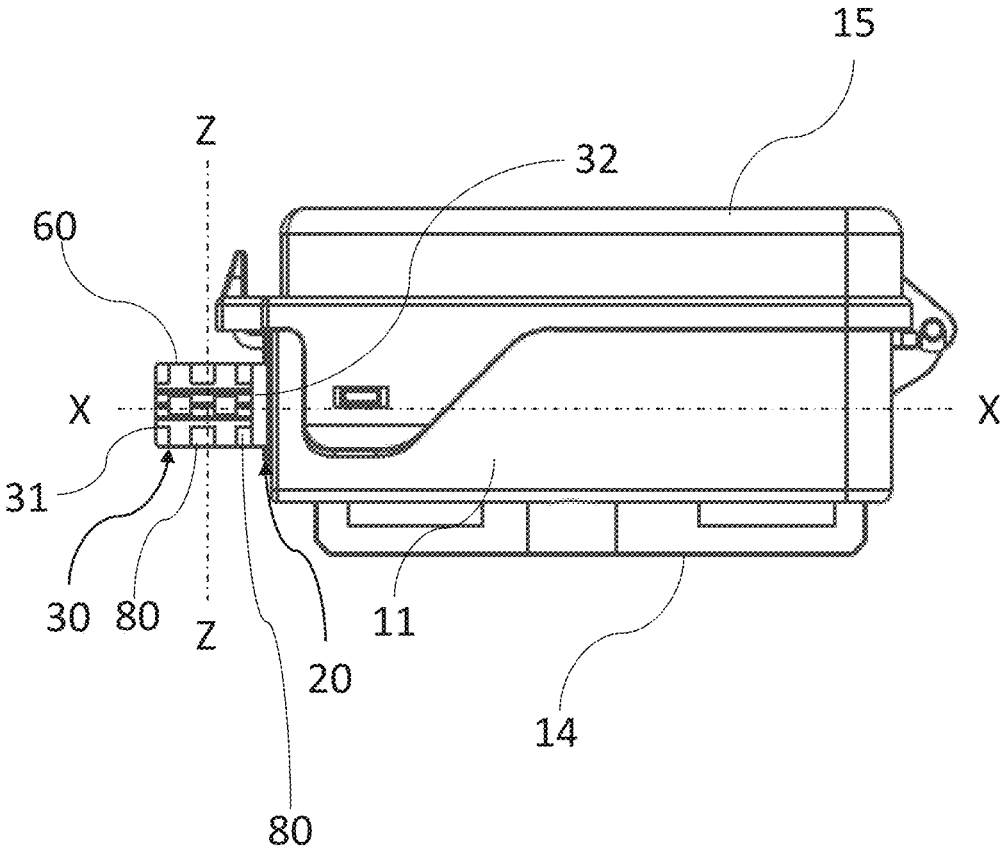
Figure 5:
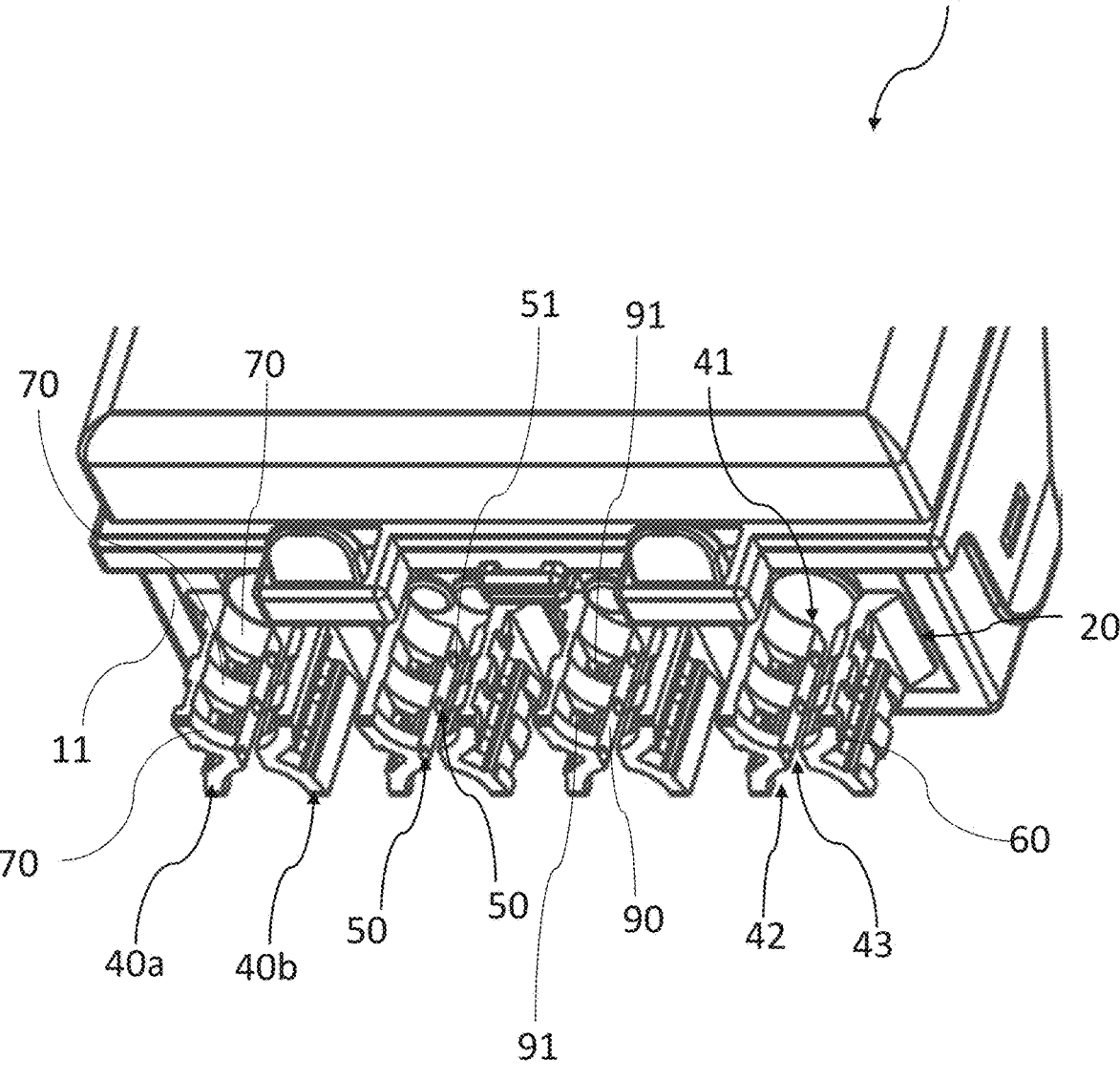
FIG. 5 is a detail of the retaining arrangement of FIG. 1.
Figure 6:
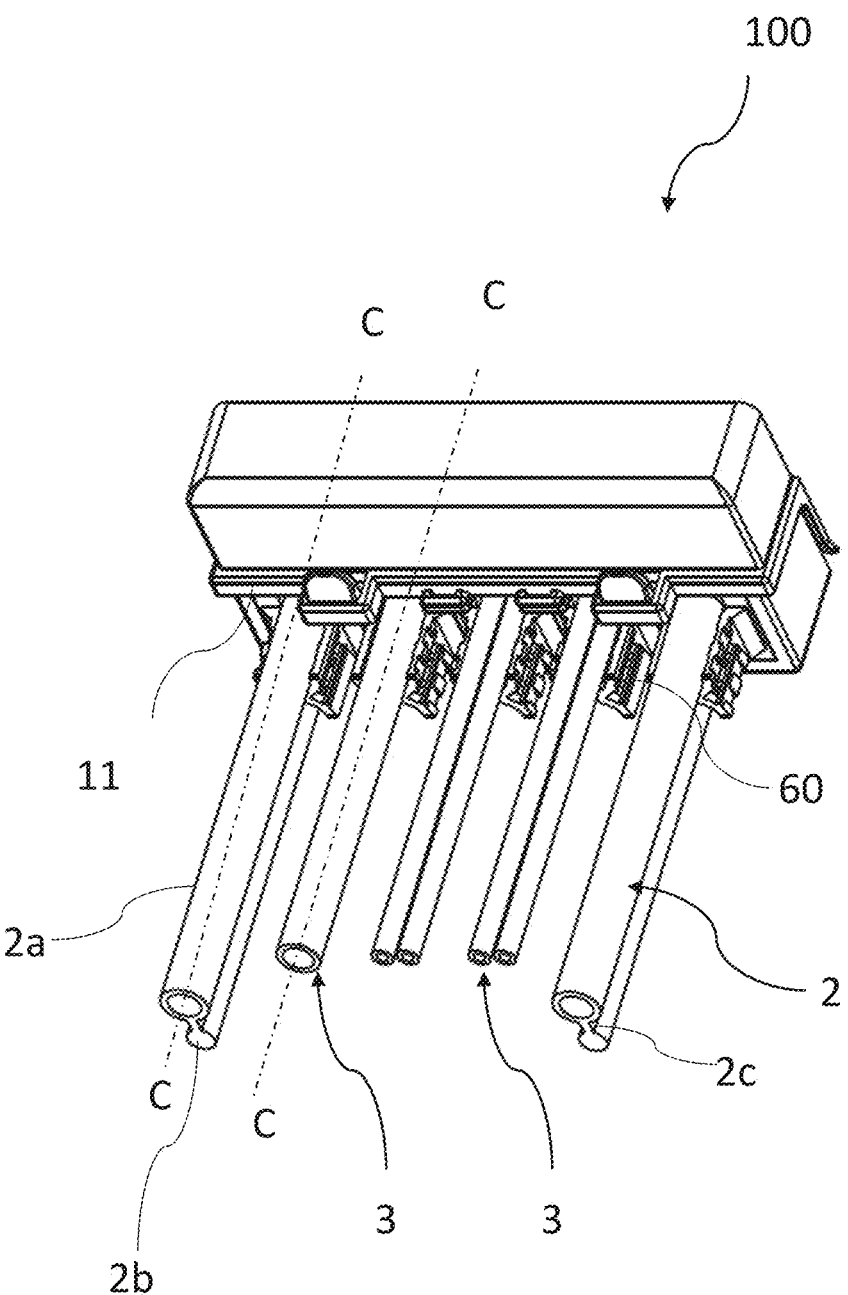
FIG. 6 is a perspective view a retaining assembly according to the retaining arrangement of the FIG. 1.

The figure-8 cable 2 is known in the art and therefore it is not described in detail. Specifically, a figure-8 cable 2 can comprise a first portion 2a and a second portion 2b mutually connected by an intermediate portion 2c. For example, as shown in FIG. 6, the first and second portion 2a, 2b have a substantially cylindrical shape and the intermediate portion 2c a prismatic shape. Namely, the figure-8 cable 2 has a section with a substantially "8" shape.

The other types of cables 3, as shown in FIG. 6, has a standard circular section shape. Namely, the other type cables 3 can have a diameter comprised, for example, in a range between 7 and 13 mm.

Furthermore, each type of cable 2, 3 has a developing axis C-C along which the cable 2, 3 extends and enters/exits into/from the cable box 10.

In the following, it has been explicitly referred to the figure-8 cable 2. Reference to cable 3 is intended to any type of cables excluding figure-8 cable. Finally, referring to cables 2, 3 is intended as any type of cables including figure-8 cable.

FIGS. 1-5 show retaining arrangements 1 for retaining cables 2, 3 according to a first embodiment.

Each centering arrangement 1 can be associated to a cable box 10 as shown in the figures. Each retaining arrangement 1 is configured to retain cables 2, 3. Namely, each retaining arrangement 1 can retain a figure-8 cable or one or more cables 3 passing through an opening 12 formed on a wall 11 of the cable box 10.

According to one embodiment, the retaining arrangement 1 is also configured to center the retained cable 2, 3 with respect to the opening 12.

The retaining arrangement 1 can be configured to retain the cables 2, 3 aligning the relative developing axis C-C of the cables 2, 3 with respect to the opening 12.

Each retaining arrangement 1 comprises an attaching element 20 configured to connect the retaining arrangement 1 to the wall 11 of the cable box 10 and a retaining element 30 extending from the attaching element 20 and configured to retain the cables 2, 3.

Specifically, the attaching element 20 is attachable to the wall 11 of the cable box 10 to attach in a removable or firmly way the retaining arrangement 1 to the wall 11.

According to one embodiment, the retaining arrangement 1 and the wall 11 are made with the same material and integral and continuous each other. Specifically, the retaining arrangement 1 is one piece element with the wall 11.

The retaining element 30 extends from the attaching element 20 along a longitudinal direction X-X. The longitudinal direction is substantially perpendicular to the wall 11. In some embodiments, the retaining element 30 extends along the longitudinal direction X-X substantially perpendicular with respect the attaching element 20 which is attachable/attached to the wall 11. Namely, the retaining element 30 extends from a free end 31 to an opposed end 32 attached to the attaching element 20.

In this way, the retaining element 30 can retain cables 2, 3 passing through the opening 12 proximate to the wall 11. In addition, the retaining element 30 can also support the cables 2, 3 passing through the opening 12.

Specifically, the retaining element 30 is configured to retain the supported cables 2, 3 with respect to the opening 12 proximate to the wall 11.

According to one embodiment, the retaining element 30 can align and center the supported cables 2,3 with respect to the opening 12. In detail, the retaining element 30 is configured to adjust the position of the developing axis C-C of the cables 2, 3 with respect to the opening 12 retaining the cables, 2, 3 and the centering them with respect to the opening 12.

The retaining arrangement 1 is configured to retain and support a figure-8 cable 2 or one or more cables 3. The retaining arrangement 1 can also center a figure-8 cable 2 or one or more cables 3 with respect the opening 12.

The retaining element 30 comprises two frames 40a, 40b mutually spaced apart along a spacing direction Y-Y perpendicular to the longitudinal direction X-X. Namely, the two frames 40a, 40b are configured to retain therebetween a figure-8 cable 2 or one or more cables 3 as shown in FIG. 6.

According to one embodiment, the frames 40a, 40b are mutually faced. Namely, the frames 40a, 40b are substantially symmetric with respect to a symmetric plan perpendicular to the wall 1 and arranged in a middle position between the frames 40a, 40b.

The two frames 40a, 40b define therebetween a first receiving area 41, a second receiving area 42 and a joining area 43.

The joining area 43 is configured to join the first receiving area 41 and the second receiving area 42.

According to one embodiment, the two frames 40a, 40b are separated along the spacing direction Y-Y and have a void therebetween. Such void defines the first receiving area 41, the second receiving area 42 and the joining area 43. Namely, the two frames 40a, 40b together define the first receiving area 41 and the second receiving area 42 and the joining area 43 is defined by the mutual separation of the two frames 40*a*, 40*b*.

Namely, the first receiving area 41 is configured to accommodate the first portion 2*a* of a figure-eight cable 2, the second receiving area 42 is configured to accommodate the second portion 2*b* of the figure-eight cable 2 and the joining area 43 is configured to accommodate the intermediate portion 2*c*.

Figure 7:
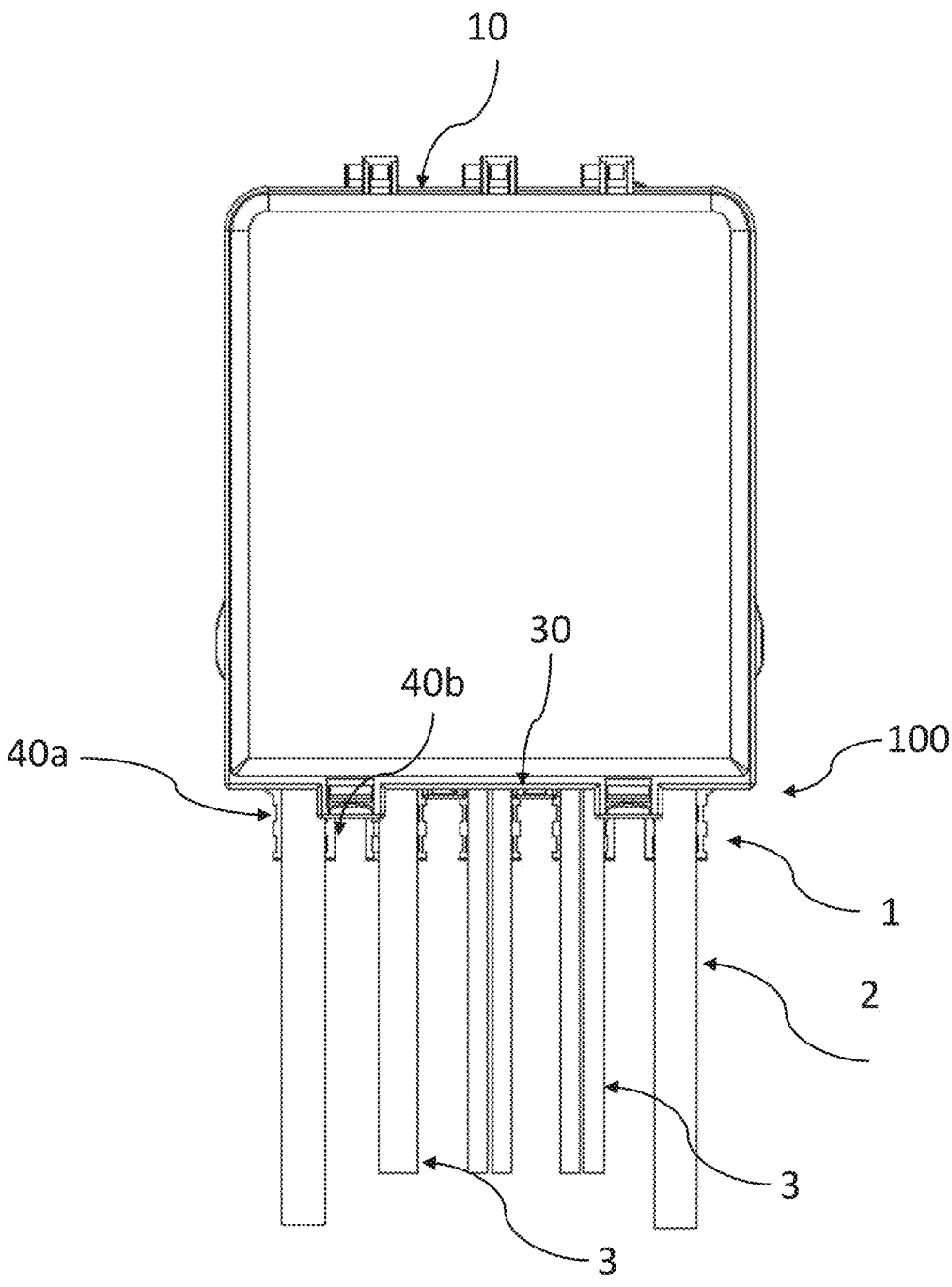
FIG. 7 is a top view of the retaining assembly of the FIG. 1.

According to one embodiment, the first accommodating area 41 and the second accommodating area 42 are also configured to accommodate one or more cables 3 as shown in FIGS. 6 and 7.

It is to be noted that in both above embodiments, the receiving areas 41, 42 and the joining area 43 are configured to retain and support a portion of the cables 2, 3 extending along the developing axis C-C.

The first receiving area 41, the second receiving area 42 and the joining area 43 extend along a transversal direction Z-Z perpendicular to the longitudinal direction X-X and to the spacing direction Y-Y as shown in FIGS. 1-6.

Thanks to the first accommodating area 41, the second accommodating area 42 and the joining area 43 which receive the figure-8 cable 2 or one or more cables 3, the retaining element 30 can retain the cables 2, 3 arranged between the frames 40*a*, 40*b*.

According to one embodiment, the retaining element 30 is also configured to support cables 2, 3 at least along the extension of the retaining element 30 with a centering effect with respect to the opening 12.

It is to be noted that the retaining element 30 is configured to prevent movement of the figure-8 cable 2 arranged between the frames 40*a*, 40*b* along the longitudinal direction X-X.

According to one embodiment, the retaining element 30 comprises friction members 50 at the joining area 43 configured to prevent sliding of the figure-eight cable 2 arranged between the frames 40*a*, 40*b* along the longitudinal direction X-X. Namely, the friction members 50 comprise one or more protrusions 51. Such protrusions are configured to engage an outer surface of the figure-eight cable 2, namely the intermediate portion 2*c*, along the longitudinal direction X-X.

According to one embodiment, the first receiving area 41, the second receiving area 42 and the joining area 43 are configured to cooperate to retain the figure-eight cable 2 along the transversal direction Z-Z perpendicular to the longitudinal direction X-X and to the spacing direction Y-Y. Namely, the retaining element 30 is configured to prevent movement of the figure-8 cable 2 arranged between the frames 40*a*, 40*b* along the transverse direction X-X thanks to the cooperation of the first and second receiving area 41, 42 which accommodate at the same time the portions of the figure-8 cable 2.

According to one embodiment, each frame 40*a*, 40*b* comprises a supporting member 60 and one or more retaining brackets 70. The supporting members 60 and the one or more retaining brackets 70 are mutually separated along the spacing direction Y-Y. The supporting member 60 extends longitudinally from the attaching element 20 along the longitudinal direction X-X. Each supporting member 60 has a first base 61 and a second base 62 mutually spaced apart along the transversal direction Z-Z. According to one embodiment, the supporting member 60 extends also transversally between the first base 61 and the second base 62 along the transversal direction Z-Z to define a supporting wall.

The one or more retaining brackets 70 are arranged mutually spaced apart along the longitudinal direction X-X and project from the supporting member 60 along the spacing direction Y-Y towards the other frame 40*a*, 40*b*.

According to the embodiment of one bracket, the bracket 70 extends substantially for the entire extension of the supporting member 60 along the longitudinal direction X-X. According to the embodiment with more brackets, the brackets 70 are arranged mutually adjacent along the longitudinal direction X-X. Specifically, the brackets 70 are spaced apart along the longitudinal direction X-X from the attaching element 20 to the free end 31. In other words, the brackets 70 are arranged mutually adjacent from the free end 31 of the retaining element 30 to the opposed end 32 attached to the attaching element 20.

The brackets 70 of the retaining element 30 can be made with the same material of the supporting elements 60 and can be made in one piece.

The retaining brackets 70 define therebetween the first receiving area 41, the second receiving area 42 and the joining area 43.

According to one embodiment, each retaining bracket 70 has a base 71 and two curved arms 72, 73 mutually diverging from the base 71. The retaining brackets 70 can have a V shape with curved arms 72, 73 as shown in the figures.

The curved arms 72, 73 comprises a first curved arm 72 and a second curved arm 73. Namely, one end of each curved arm 72, 73 is associated to the first base 61 and the other end is associated the second base 62 of the supporting member 60.

The retaining brackets 70 are configured to define the joining area 43 between the respective bases 71 and to define the first receiving area 41 and the second receiving area 42 respectively between the first arms 72 and the second arms 73.

According to one embodiment, the first receiving area 41 and the second receiving area 42 have a hemispherical shape and the joining area 53 has a prismatic shape. The first receiving area 41 is overturned or 180° rotated with respect to the second receiving area 42.

According to one embodiment, the first receiving area 41, the second receiving area 42 and the joining area 43 are counter shaped to a figure-eight cable 2.

In detail, the brackets 70 define a support surface for the cables 2, 3 which delimits the receiving area 41, 42 and the joining area.

According to one embodiment, the friction members 51 are formed on the bases 71 of the brackets 70.

According to one embodiment, the friction members 51 can be formed also on the support surfaces to improve the sliding prevention action along the longitudinal direction X-X also on the external surface of the cables 2, 3.

According to one embodiment, at least one supporting member 60 comprises retaining members 80 projecting outwards with respect to the first receiving area 41 and the second receiving area 42. Namely, the retaining members 80 are configured to retain a cable tie along the longitudinal direction X-X. In detail, the retaining members 80 are arranged on the supporting member 60 on opposite sides along the transversal direction Z-Z. The retaining members 80 are mutually spaced apart along the longitudinal direction X-X for defining therebetween an accommodating area for the cable tie. The accommodating areas are configured to receive and retain the cable tie between two adjacent retaining members 80.

According to one embodiment, the retaining members 80 are formed proximate to the first and second bases 61, 62 of at least one supporting member 60 of the retaining element 30.

Thanks to the retaining members 80, the retaining arrangement 1 with a cable tie can firmly retain the figure-8 cable 2 to the retaining element 30 preventing any movement along the longitudinal direction X-X and along the transversal direction Z-Z.

According to one embodiment, each frame 40a, 40b comprises a connecting member 90 configured to mutually connect the bases 71 of adjacent retaining brackets 70. The connecting members 90 are mutually separated along the spacing direction Y-Y accordingly. In this way, two adjacent retaining brackets 70, the supporting member 60 and the relative connecting member 90 define therebetween passing through apertures 91 configured to retain a cable tie along the longitudinal direction X-X. In detail, passing through apertures 91 are configured to receive a portion of cable tie and are defined between the spaced apart brackets 70.

Thanks to the passing through apertures 91, the retaining arrangement 1 with a cable tie can firmly retain figure eight-8 cables 2 and cables 3 to the retaining element 30 preventing movement along the longitudinal direction X-X and along the transversal direction Z-Z.

According to one embodiment, the frames 40a, 40b define at the free end 31 and the opposed end 32 relative figure-8 openings for introducing along the longitudinal direction X-X the cables 2, 3 to be retained, namely the figure-8 cable 2. Cables 3 can also be introduced directly from the receiving areas 41, 42 passing through the figure-8 openings along the transverse direction Z-Z.

According to one embodiment, the frames 40a, 40b are elastically deformable and configured to generate a compression force along the spacing direction Y-Y upon accommodation of a figure-eight cable 2. In particular, the frames 40a, 40b can mutually move apart along the spacing direction Y-Y upon positioning of figure-eight cable 2 therebetween. The moving apart of the frames 40a, 40b generates an elastic compression force in the opposed direction retaining figure-eight cable 2.

In addition, the material of the frames 40a, 40b can be chosen between polypropylene (PP), acrylonitrile butadiene styrene (ABS), acrylonitrile styrene acrylate (ASA) or polyethylene (PE) and PA6 and PC (Polycarbonate).

It is further object of the present invention a retaining assembly 100.

The retaining assembly 100 comprises the cables 2, 3 to be retained with respect to the opening 12 formed on the wall 11 of the cable box 10.

The retaining assembly 100 comprises at least one retaining arrangement 1 for retaining and supporting cables 2, 3 with respect to the box 10. According to one embodiment, the retaining assembly 100 is also configured to centering the cables 2, 3 with respect to the opening 12.

According to one embodiment, the retaining assembly 100 further comprises a cable tie associated to the retaining element 30 of the retaining arrangement 1. The retaining assembly 100 can comprise two or more cable ties for each retaining arrangement 1.

The cable tie retains the cable 2,3 to the frames 40a, 40b of the retaining element 30. Namely, the cable tie cooperates with the retaining element 30 to retain the cables 2, 3 arranged between the frames 40a, 40b. In details, the cable tie cooperates with the frames 40a, 40b to prevent longitudinal movement along the longitudinal direction X-X and movement along the transversal direction Z-Z of the cables 2, 3.

According to one embodiment, the cable tie is configured to externally surround the frames 40a, 40b and the figure-8 cable 2 arranged between the frames 40a, 40b. Namely, the cable tie can be arranged between the retaining members 80 which prevent the movement of the cable tie along the longitudinal direction X-X.

The cable tie can be configured to surround the cables 3 arranged between the frames 40a, 40b and connecting member 90 passing through the apertures 91. In this way, the adjacent brackets 70 retain the cable tie therebetween along the longitudinal direction X-X.

A further object of the present invention is a cable box 10.

The cable box 10 comprises a wall 11 having at least one opening 12 for the passage of a figure-8 cables 2 and cables 3 and at least one retaining arrangement 1 as above described wherein the attaching element 20 is attached to the wall 11 proximate to the opening 12 of the wall 11 for retaining one or more the cables 2, 3 with respect to the opening 12.

According to one embodiment, the retaining element 30 projects from the wall 11 along the longitudinal direction X-X substantially perpendicular to the wall. In this way, it is possible to retain and support a figure-8 cable 2 or one or more cables 3 to the box 10. It this way it also possible to the center the one or more cables 2, 3 with respect to the opening 12.

According to one embodiment, the cable box 10 comprises a sealing element 110 arranged at the opening 12 inside the box 10. The sealing element 110 can cooperate with the retaining arrangements 1 to centre and retain the cables 2, 3 with respect to the opening 12.

The sealing element 110 is configured to seal the opening 12 upon passage of the one or more cables 2, 3. Namely, the sealing element 110 can comprise one or more centering apertures 111, 112 configured for receiving one or more cables 2, 3 supported by the at least one retaining arrangement 1. In detail, the centering openings 111, 112 are configured to receive a figure-8 cables or cables 3 with different diameters.

According to one embodiment, the sealing element 110 extends between two opposed portions 110a, 110b along a relative first extension direction A-A. The sealing element 100 has one first centering opening 111 in a portion 110a and two second centering openings 112 in the other portion 110b. It is to be noted that the first centering opening 111 and the second centering openings 112 are configured to couple selectively with the first receiving area 41 and to the second receiving area 42. Namely, the first centering opening 111 is configured to receive a cable 3 with a first dimeter and the second centering openings 112 are configured to receive cables 3 with second diameters smaller than the first diameter.

According to one embodiment, the wall 11 defines an inner space of the box wherein the sealing elements 110 are arranged. Namely, the cable box 10 comprise a supporting base 15 and cover 14. The wall 11 projects from the supporting base 14 and defines an inner space with the cover 15 and the supporting base 14.

The cable box 10 comprises a plurality of inner walls 13 configured to retain therebetween a sealing element 13. Namely, the inner walls 13 are formed in the inner space of the cable box 10.

According to one embodiment, the inner walls 13 define retaining trails 13a, 13b configured to the retain therebetween the sealing elements 110. Namely, each sealing element 110 comprises lateral wings 113, 114 spaced apart along a second extension direction B-B perpendicular to the first extension direction A-A. The lateral wings 113, 114 are configured to slide along the retaining trails 13*a*, 13*b* to prevent longitudinal movement along longitudinal direction X-X and to centre first and second centering openings 111, 112 with the opening 12 of the wall 11. The cover 14 and the supporting base 15 are configured to prevent transversal movement of the sealing elements 110 along the transversal direction Z-Z locking the sealing elements 110 therebetween.

The invention claimed is:

1. A retaining arrangement for retaining at least a cable with respect to an opening formed on a wall of a cable box, said retaining arrangement comprising:

an attaching element configured to be attached to the wall of the cable box, and a retaining element extending from the attaching element along a longitudinal direction, the retaining element being configured to retain at least a cable passing through the opening, wherein:

the retaining element comprises two frames mutually spaced apart along a spacing direction perpendicular to the longitudinal direction, the two frames defining therebetween:

a first receiving area for accommodating a first portion of a figure-eight cable;

a second receiving area for accommodating a second portion of the figure-eight cable; and a joining area for joining the first receiving area and the second receiving area and configured to accommodate an intermediate portion of the figure-eight cable connecting the first portion and the second portion of the figure-eight cable; and the two frames each comprise:

a supporting member extending from the attaching element along the longitudinal direction; and one or more retaining brackets, arranged mutually spaced apart along the longitudinal direction and projecting from the supporting member along the spacing direction towards the other frame; and the retaining brackets defining therebetween the first receiving area, the second receiving area and the joining area.

2. The retaining arrangement according to claim 1, wherein the first receiving area, the second receiving area and the joining area are counter shaped to a figure-eight cable.

3. The retaining arrangement according to claim 1, wherein the first receiving area, the second receiving area and the joining area are configured to cooperate to retain the figure-eight cable along a transversal direction perpendicular to the longitudinal direction and to the spacing direction.

4. The retaining arrangement according to claim 1, wherein the retaining element comprises friction members at the joining area configured to prevent sliding of the figure-eight cable arranged between the frames along the longitudinal direction, the friction members comprising one or more protrusions.

5. The retaining arrangement according to claim 1, wherein each retaining bracket has a base and two curved arms mutually diverging from the base; the curved arms comprising a first curved arm and a second curved arm; and the retaining brackets are configured to define the joining area between the respective bases and to define the first receiving area and the second receiving area respectively between the first arms and the second arms.

6. The retaining arrangement according to claim 1, wherein at least one supporting member comprises retaining members projecting outwards with respect to the first receiving area and the second receiving area, the retaining members being configured to retain a cable tie along the longitudinal direction.

7. The retaining arrangement according to claim 1, wherein the two frames each further comprise a connecting member configured to mutually connect the bases of adjacent retaining brackets; two adjacent retaining brackets, the supporting member and the relative connecting member defining therebetween passing through apertures, the passing through apertures of the frames being configured to retain a cable tie along the longitudinal direction.

8. The retaining arrangement according to claim 1, wherein the two frames are elastically deformable and configured to generate a compression force along the spacing direction upon accommodation of a figure-eight cable.

9. The retaining arrangement according to claim 1, wherein the first accommodating area and the second accommodating area are configured to accommodate one or more cables.

10. A retaining assembly comprising:

a cable to be retained with respect to an opening formed on a wall of a cable box, and at least one retaining arrangement for retaining the cable with respect to the opening, wherein said at least one retaining arrangement comprises:

an attaching element configured to be attached to the wall of the cable box, and a retaining element extending from the attaching element along a longitudinal direction, the retaining element being configured to retain at least a cable passing through the opening, wherein:

the retaining element comprises two frames mutually spaced apart along a spacing direction perpendicular to the longitudinal direction, the two frames defining therebetween:

a first receiving area for accommodating a first portion of a figure-eight cable;

a second receiving area for accommodating a second portion of the figure-eight cable; and a joining area for joining the first receiving area and the second receiving area and configured to accommodate an intermediate portion of the figure-eight cable connecting the first portion and the second portion of the figure-eight cable.

11. A cable box comprising:

a wall having at least one opening for the passage of one or more cables, and at least one retaining arrangement, wherein said at least one retaining arrangement comprises:

an attaching element configured to be attached to the wall of the cable box, and a retaining element extending from the attaching element along a longitudinal direction, the retaining element being configured to retain at least a cable passing through the opening, wherein:

the retaining element comprises two frames mutually spaced apart along a spacing direction perpendicular to the longitudinal direction, the two frames defining therebetween:

a first receiving area for accommodating a first portion of a figure-eight cable;

a second receiving area for accommodating a second portion of the figure-eight cable; and a joining area for joining the first receiving area and the second receiving area and configured to accommodate an intermediate portion of the figure-eight cable connecting the first portion and the second portion of the figure-eight cable, wherein:

the attaching element is fixed to the wall proximate to the opening of the wall for retaining one or more cables with respect to the opening.

12. The cable box according to claim 11, wherein the cable box comprises a sealing element arranged at the one opening inside the box and configured to seal the opening upon passage of the one or more cables, the sealing element comprising one or more centering openings mutually combinable for receiving one or more cables supported by the at least one retaining arrangement.

13. The cable box according to claim 12, wherein the sealing element extends between two opposed portions along an extension direction, the sealing element having one first centering opening in a portion and two second centering openings in the other portion, the first centering opening and the second centering openings are configured to couple selectively with the first receiving area and to the second receiving area.

* * * * *